(12) United States Patent
Liu et al.

(10) Patent No.: US 11,690,383 B1
(45) Date of Patent: Jul. 4, 2023

(54) AIR-DRYING DEVICE FOR PROCESSING OF CURED MEAT PRODUCTS

(71) Applicant: Northeast Agricultural University, Harbin (CN)

(72) Inventors: Qian Liu, Harbin (CN); Yangyang Feng, Harbin (CN); Baohua Kong, Harbin (CN); Jianchun Han, Harbin (CN); Haotian Liu, Harbin (CN); Hongwei Zhang, Harbin (CN); Hui Wang, Harbin (CN); Hao Wang, Harbin (CN); Dongxue Yuan, Harbin (CN); Yining Xu, Harbin (CN); Shiwen Lin, Harbin (CN); Jingming Zhang, Harbin (CN)

(73) Assignee: Northeast Agricultural University, Harbin (CN)

( * ) Notice: Subject to any disclaimer, the term of this patent is extended or adjusted under 35 U.S.C. 154(b) by 0 days.

(21) Appl. No.: 18/078,664

(22) Filed: Dec. 9, 2022

(30) Foreign Application Priority Data

Mar. 23, 2022 (CN) .......................... 202210290874.X (51) Int. Cl.
*A23B 4/03* (2006.01)
*F26B 23/06* (2006.01)
*F26B 3/04* (2006.01)

(52) U.S. Cl.
CPC ............... *A23B 4/031* (2013.01); *F26B 3/04* (2013.01); *F26B 23/06* (2013.01); *A23V 2002/00* (2013.01)

(58) Field of Classification Search
CPC . A23B 4/031; F26B 3/04; F26B 23/06; A23V 2002/00
USPC .............................................................. 34/60
See application file for complete search history.

(56) References Cited

U.S. PATENT DOCUMENTS

| | | | | |
|---|---|---|---|---|
| 4,224,743 A | * | 9/1980 | Erickson | ................. F26B 21/02 126/21 A |
| 4,531,306 A | * | 7/1985 | Erickson | ................... A23L 3/40 34/225 |
| 6,182,374 B1 | * | 2/2001 | Yen | ......................... F26B 25/06 34/233 |

(Continued)

FOREIGN PATENT DOCUMENTS

| | | |
|---|---|---|
| CN | 106595241 A | 4/2017 |
| CN | 109329375 A | 2/2019 |

(Continued)

*Primary Examiner* — Stephen M Gravini
(74) *Attorney, Agent, or Firm* — Stuart H. Mayer; Mayer & Williams PC (57) ABSTRACT

Disclosed is an air-drying device for processing of cured meat products, including an air-drying treatment mechanism; the air-drying treatment mechanism includes a first box body, a top wall of the first box body is provided with a blower; a plurality of air-drying components are rotatably connected in the first box body; each air-drying component includes a first cylinder, a side wall of the first cylinder is circumferentially provided with a plurality of openable and closable air inlet channels; a top of each first cylinder is detachably connected with a cover plate, and a bottom of each first cylinder is provided with a bearing plate, and outer side walls of each first cylinder and each bearing plate are circumferentially provided with a plurality of slide rails.

10 Claims, 9 Drawing Sheets

(56) References Cited

U.S. PATENT DOCUMENTS

| | | | | |
|---|---|---|---|---|
| 8,502,116 | B2* | 8/2013 | Morganti | A23B 4/056 |
| | | | | 219/393 |
| 8,877,472 | B2* | 11/2014 | Medoff | A23K 10/12 |
| | | | | 426/240 |
| 9,587,258 | B2* | 3/2017 | Medoff | A61K 8/9717 |
| 10,064,424 | B2* | 9/2018 | Storek | A23L 5/13 |
| 2004/0081729 | A1* | 4/2004 | Garwood | B65B 31/028 |
| | | | | 426/235 |
| 2019/0281851 | A1* | 9/2019 | Ning | A23C 11/10 |
| 2020/0093327 | A1* | 3/2020 | Hua | A23L 5/10 |

FOREIGN PATENT DOCUMENTS

| | | | |
|---|---|---|---|
| CN | 208487885 U | | 2/2019 |
| CN | 213549398 A | | 6/2021 |
| CN | 215414687 A | | 1/2022 |
| CN | 114631559 A | * | 6/2022 |
| JP | 2017176033 A | | 10/2017 |

\* cited by examiner

AIR-DRYING DEVICE FOR PROCESSING OF CURED MEAT PRODUCTS

CROSS-REFERENCE TO RELATED APPLICATIONS

This application claims priority to Chinese Patent Application No. 202210290874.X, filed on Mar. 23, 2022, the contents of which are hereby incorporated by reference.

TECHNICAL FIELD

The application relates to the field of meat product processing equipment, and in particular to an air-drying device for processing of cured meat products.

BACKGROUND

Air-dried meat products are unique traditional cured meat products in China. The air-dried meat products are meat products with special and rich flavours after being made by curing raw meat with salt, nitrite, liquor, spices and other ingredients, and then air-drying. Air-drying refers to a process of drying products in a closed room at a temperature below 18° C. and a relative humidity below 70%, using mechanical ventilation or introducing clean natural air from outside. With an increase of an air-drying temperature and an air-drying duration, a content of flavour substances in the products will also increase.

Air-drying meat products may reduce a moisture content, help prolong the storage time of the meat products, and increase the flavour and taste of the meat products. At present, in the process of preparing long strips of cured meat products such as bacon, dried meat, meat strips, etc., during an air-drying operation, the meat products are mainly hung in a closed space, and the temperature is increased in the closed space, so that the temperature rises and the moisture in the meat products rises with the increase of an ambient temperature. Therefore, the moisture inside the meat products may escape, and this part of hot air with moisture may be pumped out by an exhaust fan to air dry the meat products. However, because many meat products are frozen first, the water content inside and outside of the meat products is relatively high, so it is difficult to quickly treat the moisture inside the meat products by only guiding the hot air. Moreover, a surface of a frozen meat product will freeze or form ice blocks, thus further prolonging the air-drying duration, seriously affecting a follow-up treatment and greatly reducing a mass production efficiency. Therefore, there is an urgent need for a new type air-drying device for processing of cured meat products.

SUMMARY

An objective of the application is to provide an air-drying device for processing of cured meat products, in order to solve problems existing in the prior art, so that long strips of frozen meat products may be quickly air-dried, an air-drying duration is reduced, and a mass production efficiency of the meat products processing is improved.

To achieve the above objective, the application provides a following scheme: the air-drying device for processing of the cured meat products, including:

an air-drying treatment mechanism; the air-drying treatment mechanism includes a first box body, a top wall of the first box body is provided with a blower, an air inlet end of the blower is communicated with an inside of the first box body; a plurality of air-drying components are rotatably connected in the first box body; each air-drying component includes a first cylinder, and a side wall of the first cylinder is circumferentially provided with a plurality of openable and closable air inlet channels; a top of each first cylinder is detachably connected with a cover plate, a bottom of each first cylinder is provided with a bearing plate, and outer side walls of each first cylinder and each bearing plate are circumferentially provided with a plurality of slide rails; one end of each slide rail is fixedly connected with the side wall of each bearing plate, and the other end of each slide rail abuts against the outer side wall of each first cylinder, and a slider is slidably connected in each slide rail; each slider is fixedly connected with the outer side wall of each first cylinder; a support spring is fixed between the end near the inner side of each slide rail of each first cylinder and each slider; a bottom wall of each first cylinder is circumferentially provided with a plurality of meat outlet channels, and the meat outlet channels penetrate through each bearing plate; the bottom of each cover plate is fixed with a second cylinder, and the bottom of each second cylinder abuts against the bottom wall of the inner side of each first cylinder; a plurality of heating columns are fixed in an inner circumference of each second cylinder, and a first air pump is arranged between the heating columns; a plurality of air ducts arranged in sequence at intervals are fixed in each second cylinder from top to bottom, and the side walls of the air ducts are fixedly connected and communicated with a plurality of air outlet pipes; air outlet directions of the air outlet pipes are not parallel to the air outlet direction of each first air pump; each meat hanging space is arranged between an inner side wall of each first cylinder and the outer side wall of each second cylinder, and each meat hanging space and the meat outlet channels are arranged up and down correspondingly; and the air ducts are communicated with each meat hanging space;

a disinfection collection mechanism; the disinfection collection mechanism includes a second box body, and a heating wire is embedded in the inner side wall of the second box body; the first box body and the second box body are arranged up and down correspondingly, a plurality of corrugated pipes are fixedly connected and communicated between the first box body and the second box body, and the meat outlet channels and the corrugated pipes are arranged up and down correspondingly; the bottom of the inner side of the second box body is slidably connected with an aggregate truck, and the plurality of corrugated pipes and the top of the aggregate truck are arranged up and down correspondingly; and a vibration mechanism; the vibration mechanism includes a first annular step circumferentially fixed on the outside of the first box body and a second annular step circumferentially fixed on the outside of the second box body; the bottom of the second annular step is circumferentially fixed with a plurality of first telescopic cylinders, the output end of each first telescopic cylinder passes through the second annular step and is fixedly connected with a push plate, and a plurality of vibration springs are fixedly connected between the top end of the push plate and the bottom end of the first annular step.

In an embodiment, the outside of each second cylinder is covered with an air bag, and the outer side of the air bag is covered with a rubber sleeve; connecting pipes are inserted between each second cylinder, each air bag and each rubber sleeve; one end of each connecting pipe is communicated with each air duct, and the other end of each connecting pipe is communicated with each meat hanging space; the top of each air bag is fixedly connected and communicated with each hose, the top of each hose penetrates through each cover plate and is communicated with a gas collecting pipe; the hoses of the plurality of air-drying components are all communicated with the gas collecting pipe, and flexible connectors are fixedly connected between the gas collecting pipe and the hoses, and the gas collecting pipe is communicated with a second air pump, and the second air pump is fixedly connected to the top wall inside the first box body.

In an embodiment, the bottom of each cover plate is circumferentially fixed with a plurality of hanging ropes, and the bottom ends of the hanging ropes are fixed with hooks, and the hooks are located in each meat hanging space, and the top ends of the hooks are provided with blades; the bottom of each bearing plate is fixed with a supporting plate through a plurality of supporting columns, and there are gaps between the supporting columns; the bottom end of each supporting plate is fixed with each second telescopic cylinder, and the output end of each second telescopic cylinder penetrates through each supporting plate and is fixed with each blocking block, and each blocking block is slidably connected in each meat outlet channel; the top end of each blocking block is fixed with a clamping component, and each hook and each clamping component are arranged up and down correspondingly.

In an embodiment, each clamping component includes a chute fixed at the top of each blocking block; a two-way screw is arranged in the chute; one end of the two-way screw is fixedly connected with an output shaft of a second motor, and the other end of the two-way screw is pivotally connected with a second shaft sleeve; the second motor and the second shaft sleeve are fixedly connected to both ends inside the chute, respectively; two screw nuts are slidably connected to the two-way screw; the movement directions of the two screw nuts are opposite, and the top ends of the two lead screw nuts are respectively fixed with a clamping block; and the hooks and the clamping blocks are arranged up and down correspondingly.

In an embodiment, a plurality of guide plates are circumferentially hinged at a joint between each blocking block and the output end of each second telescopic cylinder, and a plurality of stoppers are circumferentially fixed at the bottom end of each blocking block, and one end of each stopper close to the output end of each second telescopic cylinder abuts against each guide plate.

In an embodiment, a plurality of first motors are fixedly connected to the bottom wall of the inner side of the first box body, and the first motors correspond to the air-drying components one by one, and the output ends of the first motors are fixedly connected with support rods, and the support rods are fixedly connected to the bottom ends of the bearing plates; the outer cover of each first motor is provided with a guide sleeve, and each guide sleeve is fixedly connected to the bottom end of each bearing plate; the outer side wall of each guide sleeve is an arc-shaped surface; each guide sleeve is located between the plurality of supporting plates, and the lowest point of each guide sleeve is located at the bottom of each supporting plate; a partition is fixed in the first box body, a plurality of first sleeves are embedded in the partition, and the first cylinders are rotatably connected in the first sleeves.

In an embodiment, the light shielding plates are embedded in the side walls of the first box body, and the ends of the partition are fixedly connected with the light shielding plates.

In an embodiment, the side wall of the second box body is provided with a discharge port, and the discharge port is arranged corresponding to the aggregate truck, and the discharge port is detachably connected with a door panel.

In an embodiment, the aggregate truck includes a bottom plate, the top end of the bottom plate is circumferentially fixed with a baffle plate, the bottom end of the bottom plate is pivotally connected with a plurality of rollers, and the top end of the bottom plate faces the corrugated pipes.

In an embodiment, the bottom of the first box body and the top of the second box body are both penetrated with material conveying channels; one end of each corrugated pipe is fixedly connected in the material conveying channel of the first box body, and the other end of each corrugated pipe is fixedly connected in the material conveying channel of the second box body.

The application discloses following technical effects. The meat products are placed in each meat hanging space in advance. During the rotation of the air-drying components, the outside air is introduced into the first box body by the blower, and flows to each air-drying component. Under the action of each first air pump, the outside air enters each first cylinder through the air inlet channels to air-dry the meat products in each meat hanging space in all directions, while the outside air passes through the air ducts, and sent out to each second cylinder through the air outlet pipes. During this process, the first telescopic cylinders are in an open state. Because the first box body and the second box body are in a split structure and are connected with each other through the telescopic corrugated pipes, the output ends of the first telescopic cylinders drive the push plates to reciprocate. A vibration amplitude is increased by the vibration springs during a reciprocating movement, so as to provide a vibration force to an internal structure of the first box body during an up and down reciprocating. When the bearing plates receive the vibration force, the bearing plates transmit the vibration force to the first cylinders, so that the first cylinders have an upward movement trend and a downward movement trend, so that the sliders push the support springs in the slide rails or are bounced back by the support springs to reset. In this movement mode, the meat products in each meat hanging space have the upward movement trend and the downward movement trend, so that ice or frost attached to surfaces of the meat products may be shaken off. In addition, because the second cylinders move synchronously with the first cylinders, the air ducts and the air outlet pipes sway upwards and downwards, disturbing the outside air sent out by the air outlet pipes, so that the outside air is quickly heated by the heating columns to form the hot air. The hot air accumulated in each second cylinder flows back to each meat hanging space under a pressure difference and a power provided by each first air pump, and the meat products are dried during a shaking process. After the hot air blows out of each first cylinder, each first air pump stops working; most of the water drops contained in the hot air condense and fall when the temperature difference between inside and outside is large, so as to ensure that the outside air does not be combined with the water drops in a process of re-charging. The air-drying of the meat products may be quickly completed by a circulation interval air inlet and outlet. The meat products enter the corrugated pipes through the meat outlet channels after the air-drying, and are transmitted to the aggregate truck through the corrugated pipes. The meat products are sterilized at the high temperature in the second box body under the action of the heating wire. According to the application, the frozen strip-shaped meat products may be quickly air-dried, an air-drying duration is reduced, and a mass production efficiency of a cured meat products processing is improved.

BRIEF DESCRIPTION OF THE DRAWINGS

In order to more clearly explain embodiments of the application or technical solutions in the prior art, the following briefly introduces drawings that need to be used in the embodiments. Obviously, the drawings in the following description are only some embodiments of the application. For those of ordinary skill in the art, other drawings may be obtained according to these drawings without any creative effort.

DETAILED DESCRIPTION OF THE EMBODIMENTS

Technical solutions in embodiments of the application are clearly and completely described below with reference to drawings in the embodiments of the application. Obviously, the described embodiments are only part of the embodiments of the application, but not all of them. Based on the embodiment of the application, all other embodiments obtained by ordinary technicians in the field without creative labor are within a scope of the application.

In order to make the above objects, features and advantages of the application more obvious and understandable, the application is explained in further detail below with reference to the drawings and detailed description.

Figure 1:
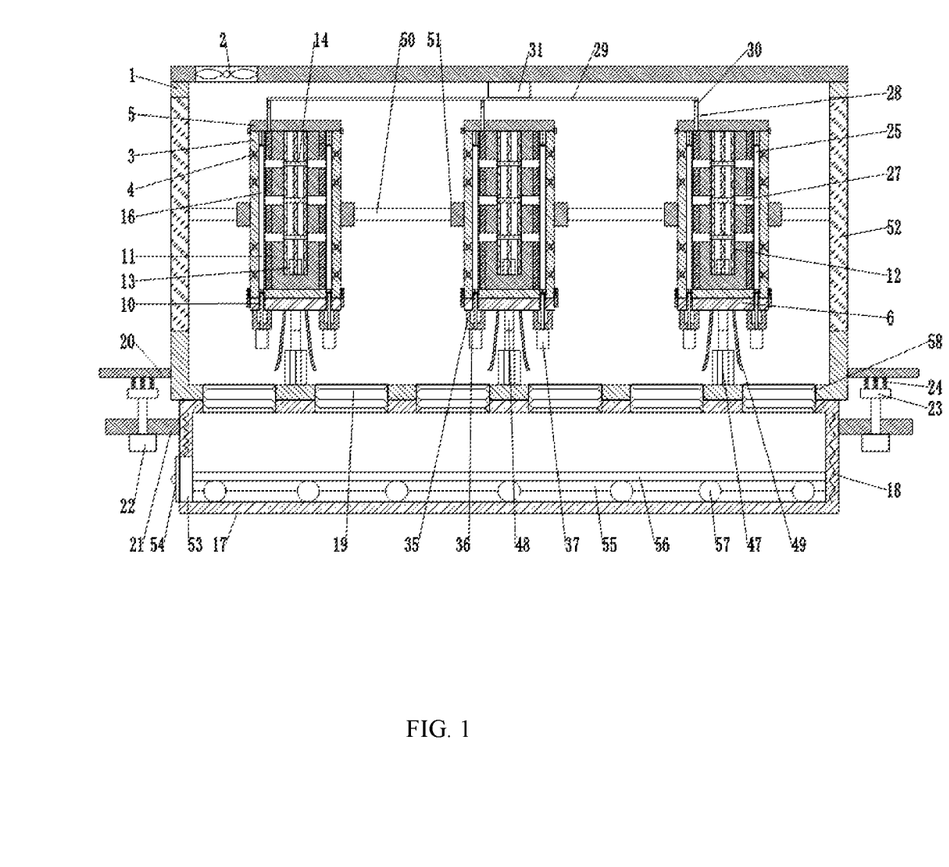
FIG. 1 is a front view of an air-drying device for processing meat products according to the application.
Figure 2:
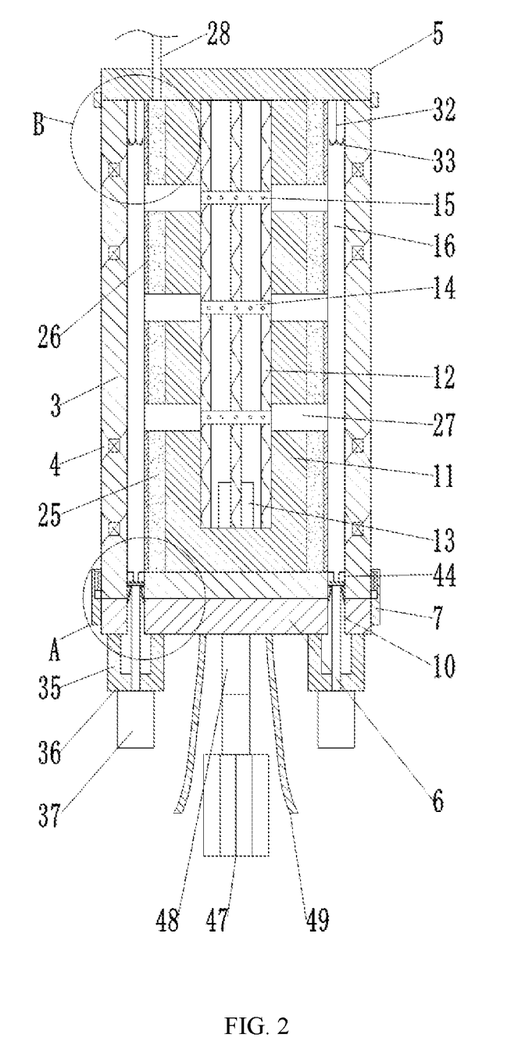
FIG. 2 is a front view of an air-drying component according to the application.
Figure 5:
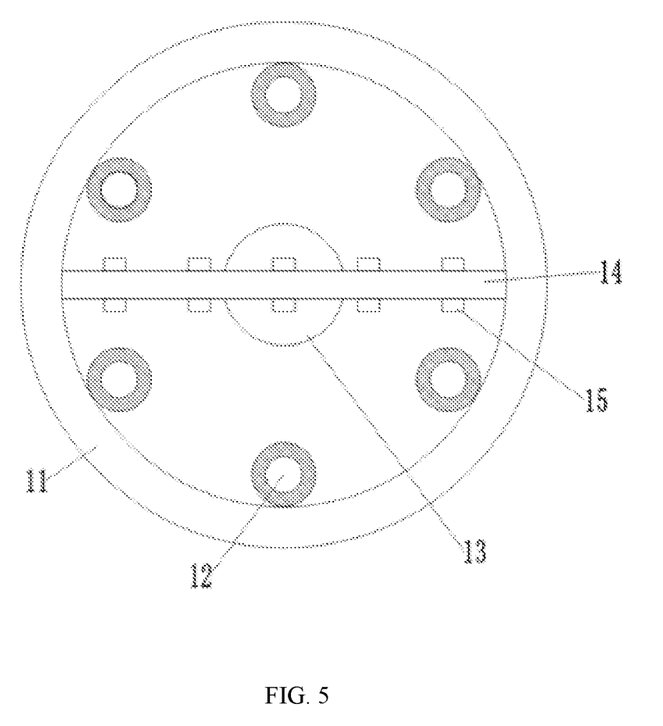
FIG. 5 is a plan view of a second cylinder according to the application.

With Reference to FIGS. 1-2, the application provides an air-drying device for processing of cured meat products, including:

an air-drying treatment mechanism; the air-drying treatment mechanism includes a first box body 1, a top wall of the first box body 1 is provided with a blower 2, an air inlet end of the blower 2 is communicated with an inside of the first box body 1, and outside air is introduced into the inside of the first box body 1 through the blower 2 to flow; a plurality of air-drying components are rotatably connected in the first box body 1, and the air-drying components rotate in the first box body 1 under actions of respective drivers, so that the outside air air-drying meat products in all directions when entering first cylinders 3; each air-drying component includes a first cylinder 3, a side wall of the first cylinder 3 is circumferentially provided with a plurality of openable and closable air inlet channels 4, and the outside air enters the first cylinder 3 through the air inlet channels 4; when each second cylinder 11 is inflated and there is a large pressure difference between each first cylinder 3 and each second cylinder 11, the air inlet channels 4 are closed, and hot air is sent out by the pressure difference and each first air pump 13, and the hot air flows in each meat hanging space 16 for a period of time; then, the air inlet channels 4 are opened to send out the hot air, and the air inlet channels 4 are closed again after sending out the hot air; after the hot air flows in the first box body 1 for a period of time, and contained water drops condense and fall off, the air inlet channels 4 are opened again to introduce the outside air for recycling; a top of each first cylinder 3 is detachably connected with a cover plate 5, a bottom of each first cylinder 3 is provided with a bearing plate 6, and outer side walls of each first cylinder 3 and each bearing plate 6 are circumferentially provided with a plurality of slide rails 7; one end of each slide rail 7 is fixedly connected with the side wall of each bearing plate 6, and the other end of each slide rail 7 abuts against the outer side wall of each first cylinder 3, and a slider 8 is slidably connected in each slide rail 7; each slider 8 is fixedly connected with the outer side wall of each first cylinder 3; a support spring 9 is fixed between the end near the inner side of each slide rail 7 of each first cylinder 3 and each slider 8; when an external vibration force is transmitted to each bearing plate 6 and each first cylinder 3, each slider 8 moves back and forth along each slide rail 7, and each slider 8 presses each support spring 9 in each slide rail 7 or is bounced back by each support spring 9 to reset; in this movement mode, the meat products in each meat hanging space 16 have an upward movement trend and a downward movement trend, so that ice or frost attached to surfaces of the meat products may be shaken off, and the end above each slide rail 7 acts as a limit to each slider 8 to ensure that each first cylinder 3 is not separated from each bearing plate 6; a bottom wall of each first cylinder 3 is circumferentially provided with a plurality of meat outlet channels 10, and the meat outlet channels 10 penetrate through each bearing plate 6, and the meat products in each meat hanging space may be guided out through the meat outlet channels 10; the bottom of each cover plate 5 is fixed with a second cylinder 11, and the bottom of each second cylinder 11 abuts against the bottom wall of the inner side of each first cylinder 3; in an initial state, the meat products are hung at the bottom of each cover plate 5, and then each cover plate 5 is buckled with each first cylinder 3; at this time, each second cylinder 11 extends into each first cylinder 3, and each meat hanging space 16 is formed between each second cylinder 11 and each first cylinder 3, and the meat products are located in each meat hanging space 16; a plurality of heating columns 12 are fixed in an inner circumference of each second cylinder 11, and a first air pump 13 is arranged between the heating columns 12; a plurality of air ducts 14 arranged in sequence at intervals are fixed in each second cylinder 11 from top to bottom, and the side walls of the air ducts 14 are fixedly connected and communicated with a plurality of air outlet pipes 15 (refer to FIG. 5); the outside air may be introduced from the air ducts 14 through each first air pump 13 and into the second cylinder 11 through the air outlet pipes 15, the outside air is heated by the heating columns 12, and air outlet directions of the air outlet pipes 15 are not parallel to the air outlet direction of each first air pump 13; the air outlet direction of each first air pump 13 is vertically upward, and the air outlet directions of the air outlet pipes 15 are horizontal, thus ensuring that the outside air may be fully disturbed when the air outlet pipes 15 send out the outside air in a vibration state, instead of being directly sucked into the first air pump 13 downward. Each meat hanging space 16 is arranged between the inner side wall of each first cylinder 3 and the outer side wall of each second cylinder 11, and each meat hanging space 16 and the meat outlet channels 10 are arranged up and down correspondingly; the air ducts 14 are communicated with each meat hanging space 16, and the air ducts 14 blow out the hot air to dry the meat products in each meat hanging space 16;

a disinfection collection mechanism; the disinfection collection mechanism includes a second box body 17, and a heating wire 18 is embedded in the inner side wall of the second box body 17; the first box body 1 and the second box body 17 are arranged up and down correspondingly, a plurality of corrugated pipes 19 are fixedly connected and communicated between the first box body 1 and the second box body 17, and the meat outlet channels 10 and the corrugated pipes 19 are arranged up and down correspondingly; the bottom of the inner side of the second box body 17 is slidably connected with an aggregate truck, and the plurality of corrugated pipes 19 and the top of the aggregate truck are arranged up and down correspondingly; the meat products sent out from the meat outlet channels 10 enter the second box body 17 through the corrugated pipes 19, and fall on the aggregate truck; the heating wire 18 is used to heat the inside of the second box body 17, and the meat products are disinfected at a high temperature again; the bottom of the first box body 1 and the top of the second box body 17 are both penetrated with material conveying channels 58; one end of each corrugated pipe 19 is fixedly connected in the material conveying channel 58 of the first box body 1, and the other end of each corrugated pipe 19 is fixedly connected in the material conveying channel 58 of the second box body 17; because the first box body 1 and the second box body 17 are of a split structure, and are connected by the retractable corrugated pipes 19, the first box body 1 and the second box body 17 may be separated under the vibration state, but may be reset by using the corrugated pipes 19 and may not be completely separated; the communicated upper and lower material conveying channels 58 play a guiding role for the corrugated pipes 19, so as to prevent the corrugated pipes 19 from being unable to reset due to displacements during a process of up and down expansion; and a vibration mechanism; the vibration mechanism includes a first annular step 20 circumferentially fixed on the outside of the first box body 1 and a second annular step 21 circumferentially fixed on the outside of the second box body 17; the bottom of the second annular step 21 is circumferentially fixed with a plurality of first telescopic cylinders 22, the output end of each first telescopic cylinder 22 passes through the second annular step 21 and is fixedly connected with a push plate 23, and a plurality of vibration springs 24 are fixedly connected between the top end of the push plate 23 and the bottom end of the first annular step 20; the output end of each first telescopic cylinder 22 drives each push plate 23 to reciprocate; during a reciprocating movement, the vibration springs 24 are used to increase a vibration amplitude, so as to provide a vibration force to an internal structure of the first box body 1 during the reciprocating movement up and down.

In an embodiment, a plurality of first motors 47 are fixedly connected to the bottom wall of the inner side of the first box body 1, and the first motors 47 correspond to the air-drying components one by one, and the output ends of the first motors 47 are fixedly connected with support rods 48, and the support rods 48 are fixedly connected to the bottom ends of the bearing plates 6, so that the air-drying components may be set up to a certain height and the meat products may fall smoothly; a partition 50 is fixed in the first box body 1, a plurality of first sleeves 51 are embedded in the partition 50, and the first cylinders 3 are rotatably connected in the first sleeves 51; the first motors 47 are used as drivers of the air-drying components to drive the air-drying components to rotate; the partition 50 and the first sleeves 51 arranged on the partition 50 may support the air-drying components and provide a structure for the air-drying components to move passively. Light shielding plates 52 are embedded in the side walls of the first box body 1, and the ends of the partition 50 are fixedly connected with the light shielding plates 52. The light shielding plates 52 may prevent a deterioration of the meat products caused by a long-term sunlight radiation.

Figure 8:
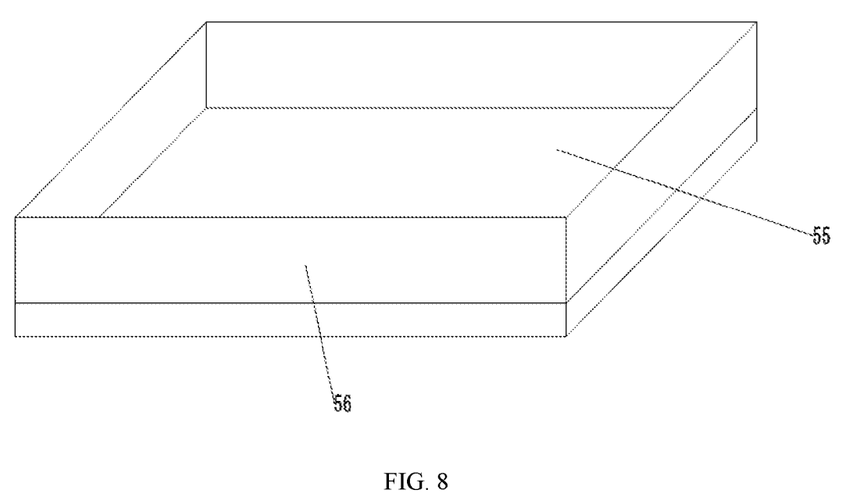
FIG. 8 is a schematic structural diagram of an aggregate truck according to the application.

In an embodiment, the side wall of the second box body 17 is provided with a discharge port 53, and the discharge port 53 is arranged corresponding to the aggregate truck, and the discharge port 53 is detachably connected with a door panel 54. When the inside of the second box body 17 is disinfected, the door panel 54 is opened to take out the aggregate truck from the discharge port 53. The aggregate truck includes a bottom plate 55, the top end of the bottom plate 55 is circumferentially fixed with a baffle plate 56 (see FIG. 8), the bottom end of the bottom plate 55 is pivotally connected with a plurality of rollers 57, and the top end of the bottom plate 55 faces the corrugated pipes 19. The meat products conveyed by the corrugated pipes 19 fall on the top surface of the bottom plate 55, and the baffle plate 56 may prevent the meat products from falling out of the aggregate truck, and the aggregate truck is moved by the rollers 57.

When the device is used, the meat products are placed in each meat hanging space 16 in advance. During the rotation of the air-drying components, the outside air is introduced into the first box body 1 by the blower 2, and flows to each air-drying component. Under the action of each first air pump 13, the outside air enters each first cylinder 3 through the air inlet channels 4 to air-dry the meat products in each meat hanging space 16 in all directions, while the outside air passes through the air ducts 14, and sent out to each second cylinder 11 through the air outlet pipes 15. During this process, the first telescopic cylinders 22 are in an open state. Because the first box body 1 and the second box body 17 are in the split structure and are connected with each other through the telescopic corrugated pipes 19, the output ends of the first telescopic cylinders 22 drive the push plates 23 to reciprocate. The vibration amplitude is increased by the vibration springs 24 during the reciprocating movement, so as to provide the vibration force to the internal structure of the first box body 1 during the up and down reciprocating; when the bearing plates 6 receive the vibration force, the bearing plates 6 transmit the vibration force to the first cylinders 3, so that the first cylinders 3 have an upward movement trend and a downward movement trend, so that the sliders 8 push the support springs 9 in the slide rails 7 or are bounced back by the support springs 9 to reset. In this movement mode, the meat products in each meat hanging space 16 have the upward movement trend and the downward movement trend, so that ice or frost attached to the surfaces of the meat products may be shaken off. In addition, because the second cylinders 11 move synchronously with the first cylinders 3, the air ducts 14 and the air outlet pipes 15 sway upwards and downwards, disturbing the outside air sent out by the air outlet pipes 15, so that the outside air is quickly heated by the heating columns 12 to form the hot air. The hot air accumulated in each second cylinder 11 flows back to each meat hanging space 16 under the pressure difference and the power provided by each first air pump 13, and the meat products are dried during a shaking process. After the hot air blows out of each first cylinder 3, each first air pump 13 stops working; most of the water drops contained in the hot air condense and fall when the temperature difference between inside and outside is large, so as to ensure that the outside air does not be combined with the water drops in a process of re-charging. The air-drying of the meat products may be quickly completed by the circulation interval air inlet and outlet. The meat products enter the corrugated pipes 19 through the meat outlet channels 10 after the air-drying, and are transmitted to the aggregate truck through the corrugated pipes 19. The meat products are sterilized at the high temperature in the second box body 17 under the action of the heating wire 18. According to the application, the frozen strip-shaped meat products may be quickly air-dried, an air-drying duration is reduced, and a mass production efficiency of a meat product processing is improved.

Embodiment 1

This embodiment provides an extrusion structure. A concrete scheme is that the outer side of each second cylinder 11 is covered with an air bag 25, and the outer side of the air bag 25 is covered with a rubber sleeve 26. Connecting pipes 27 are inserted between each second cylinder 11, each air bag 25 and each rubber sleeve 26. One end of each connecting pipe 27 is communicated with each air duct 14, and the other end of each connecting pipe 27 is communicated with each meat hanging space 16, and each meat hanging space 16 and each second cylinder 11 transmit air flow through the connecting pipes 27. The top of each air bag 25 is fixedly connected and communicated with each hose 28, the top of each hose 28 penetrates through each cover plate 5 and is communicated with a gas collecting pipe 29. The hoses 28 of the plurality of air-drying components are all communicated with the gas collecting pipe 29, and flexible connectors 30 are fixedly connected between the gas collecting pipe 29 and the hoses 28, and the gas collecting pipe 29 is communicated with a second air pump 31, and the second air pump 31 is fixedly connected to the top wall inside the first box body 1. In order to quickly discharge moisture inside the meat products, when the hot air flows back to each meat hanging space 16, the second air pump 31 is turned on to send out the air flow, and the hot air is dispersed to each hose 28 through the gas collecting pipe 29, and each air bag 25 is filled. The air bags 25 deform and squeeze the meat products through the rubber sleeves 26 on the outside of the airbags 25, so as to help guide the moisture inside the meat products to flow out to the outside and speed up the drying. Through arrangements of the flexible connectors 30 and the hoses 28, it is ensured that the air-drying components do not interfere in a rotation process and do not affect the air bags 25.

Embodiment 2

Figure 3:
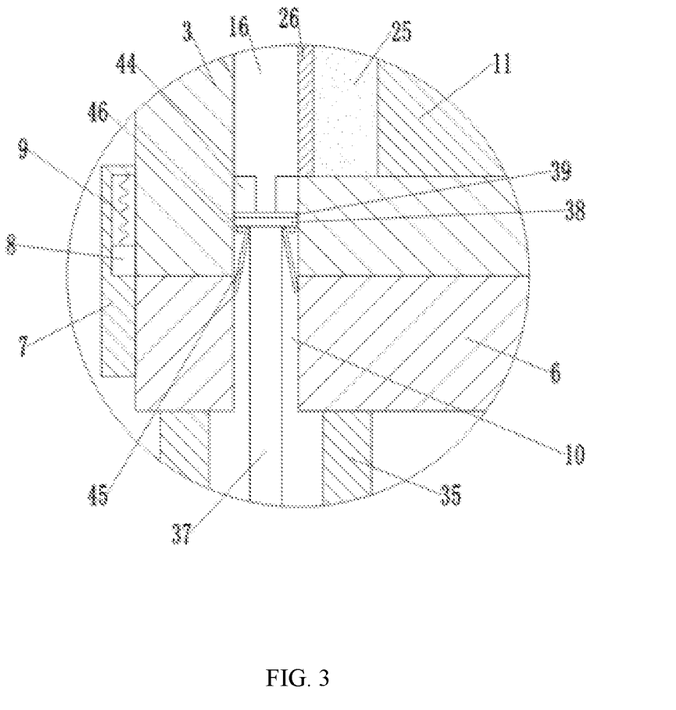
FIG. 3 is a partial enlarged view of A in FIG. 2.
Figure 4:
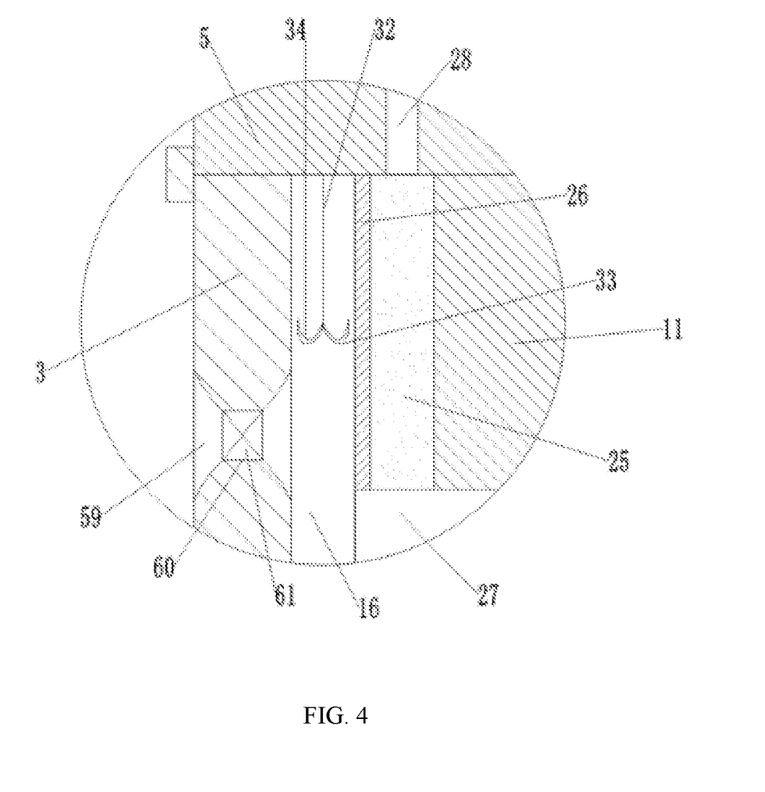
FIG. 4 is a partial enlarged view of B in FIG. 2.
Figure 9:
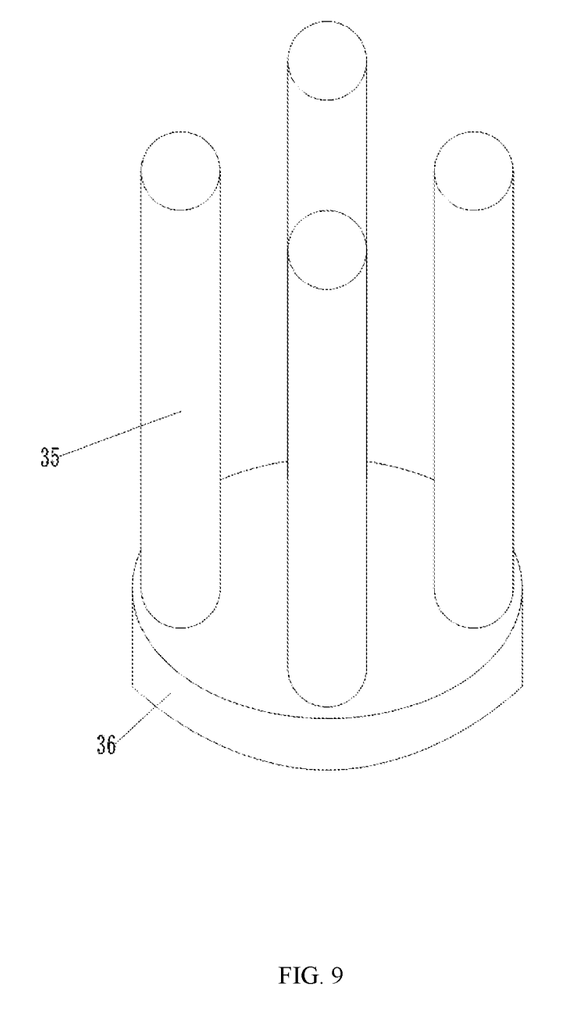
FIG. 9 is a structural diagram of support columns according to the application.

This embodiment provides a meat hanging structure and a guiding structure, and the meat hanging structure is shown in FIG. 3-4. The bottom of each cover plate 5 is circumferentially fixed with a plurality of hanging ropes 32, and the bottom ends of the hanging ropes 32 are fixed with hooks 33, and the hooks 33 are located in each meat hanging space 16, and the top ends of the hooks 33 are provided with blades 34. The bottom of each bearing plate 6 is fixed with a supporting plate 36 through a plurality of supporting columns 35, and there are gaps between the supporting columns 35 (see FIG. 9). The bottom end of each supporting plate 36 is fixed with each second telescopic cylinder 37, and the output end of each second telescopic cylinder 37 penetrates through each supporting plate 36 and is fixed with each blocking block 38, and each blocking block 38 is slidably connected in each meat outlet channel 10. The top end of each blocking block 38 is fixed with a clamping component, and each hook 33 and each clamping component are arranged up and down correspondingly. In the initial state, the top end of each meat product is hung on each hook 33, and the bottom end is clamped on each clamping component. After the air-drying operation, each second telescopic cylinder 37 drives each blocking block 38 to retract, so that each meat product is pulled, and the top end of each meat product may be separated from each hook 33 under the action of each blade 34. Then, each meat product is sent out through each meat outlet channel 10, and falls to the corrugated pipes 19 through the gaps between the supporting columns 35.

Figure 6:
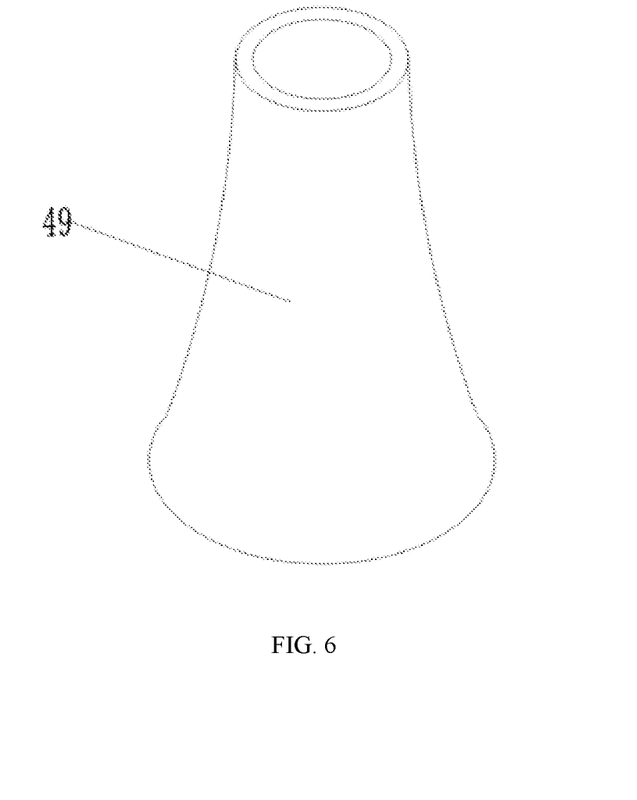
FIG. 6 is a structural diagram of a guide sleeve according to the application.

A specific scheme of the guiding structure is as follows: a plurality of guide plates 45 are circumferentially hinged at a joint between each blocking block 38 and the output end of each second telescopic cylinder 37, and a plurality of stoppers 46 are circumferentially fixed at the bottom end of each blocking block 38, and one end of each stopper 46 close to the output end of each second telescopic cylinder 37 abuts against each guide plate 45. The outer cover of each first motor 47 is provided with a guide sleeve 49, and each guide sleeve 49 is fixedly connected to the bottom end of each bearing plate 6. The outer side wall of each guide sleeve 49 is an arc-shaped surface (refer to FIG. 6). Each guide sleeve 49 is located between the plurality of supporting plates 36, and the lowest point of each guide sleeve 49 is located at the bottom of each supporting plate 36. After each blocking block 38 comes out of each meat outlet channel 10, under the action of the hinge, each guide plate 45 opens and abuts against each stopper 46 to form a plurality of landslide structures, so as to facilitate an introduction of the meat products into the corrugated pipes 19. The guide sleeves 49 are provided to prevent the meat products from falling to the first motors 47, and the meat products that hit the positions of the guide sleeves 49 may be sent to the corrugated pipes 19 under a guiding action.

Embodiment 3

Figure 7:
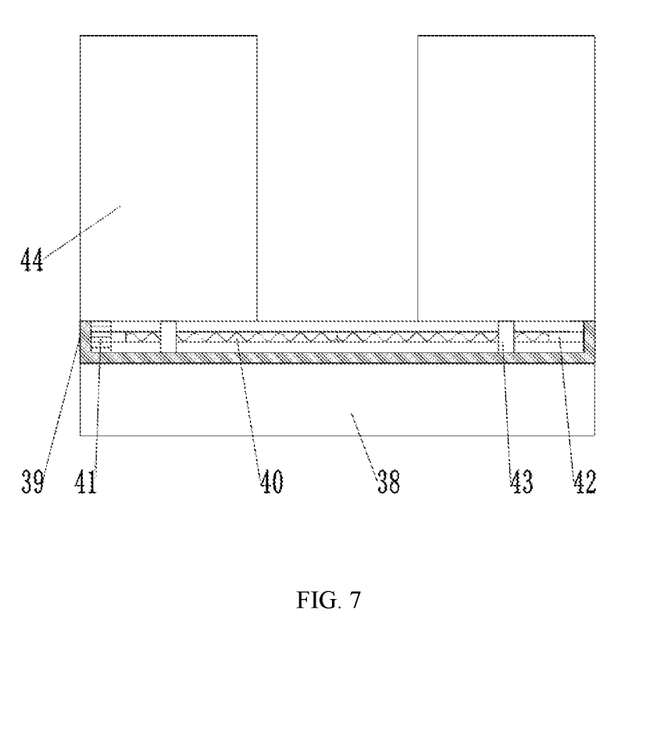
FIG. 7 is a structural diagram of a clamping assembly according to the application.

This embodiment provides the clamping component. With Reference to FIG. 7, each clamping component includes a chute 39 fixed at the top of each blocking block 38. A two-way screw 40 is arranged in the chute 39. One end of the two-way screw 40 is fixedly connected with an output shaft of a second motor 41, and the other end of the two-way screw 40 is pivotally connected with a second shaft sleeve 42. The second motor 41 and the second shaft sleeve 42 are fixedly connected to both ends inside the chute 39, respectively. Two screw nuts 43 are slidably connected to the two-way screw 40. The movement directions of the two screw nuts 43 are opposite, and the top ends of the two lead screw nuts 43 are respectively fixed with a clamping block 44. The hooks 33 and the clamping blocks 44 are arranged up and down correspondingly. When the second motor 41 is turned on, the two-way screw 40 rotates and drives the two screw nuts 43 to move in the opposite directions, and the two screw nuts 43 move to a central position at the same time, so that the bottom end of each meat product may be clamped.

Embodiment 4

In this embodiment, the air inlet channels 4 are further optimized. With Reference to FIG. 4, each air inlet channel 4 includes two expanding sections 59 and a reducing section 60 connected between the two expanding sections 59. A flow rate may be increased by using a principle of Laval structure holes, so that a circulation speed of outside air may be increased to a certain extent. An electromagnetic valve 61 is arranged in the reducing section 60, and the opening state and the closing state of each air inlet channel 4 are controlled by the electromagnetic valve 61.

In a description of the application, it should be understood that the terms "vertical", "horizontal", "top", "bottom", "front", "back", "left", "right", "vertical", "horizontal", "top", "bottom", "inside", "outside" and other directions or positional relationships indicated are based on the directions or positional relationships shown in the drawings, only for the convenience of describing the application, rather than indicating or implying that the device or element referred to must have a specific orientation, be constructed and operate in a specific orientation, it cannot be understood as a limitation of the application.

The above-mentioned embodiments only describe a preferred mode of the application, but do not limit the scope of the application. On a premise of not departing from a design spirit of the application, all kinds of modifications and improvements made by ordinary technicians in the field to the technical scheme of the application shall fall within the scope of protection defined by claims of the application.

What is claimed is:

1. An air-drying device for processing of cured meat products, comprising:
    an air-drying treatment mechanism; wherein the air-drying treatment mechanism comprises a first box body (1), a top wall of the first box body (1) is provided with a blower (2), an air inlet of the blower (2) is communicated with an inside of the first box body (1); a plurality of air-drying components are rotatably connected in the first box body (1); each air-drying component comprises a first cylinder (3), and a side wall of the first cylinder (3) is circumferentially provided with a plurality of openable and closable air inlet channels (4); a top of each first cylinder (3) is detachably connected with a cover plate (5), a bottom of each first cylinder (3) is provided with a bearing plate (6), and an outer side wall of each first cylinder (3) and each bearing plate (6) are circumferentially provided with a plurality of slide rails (7); an upper section of each slide rail (7) is fixedly connected with the side wall of each bearing plate (6), and a lower section of each slide rail (7) abuts against the outer side wall of each first cylinder (3), and a slider (8) is slidably connected in each slide rail (7); each slider (8) is fixedly connected with the outer side wall of each first cylinder (3); a support spring (9) is fixed between the end near an inner side of each slide rail (7) of each first cylinder (3) and each slider (8); a bottom wall of each first cylinder (3) is circumferentially provided with a plurality of meat outlet channels (10), and the meat outlet channels (10) penetrate through each bearing plate (6); a bottom of each cover plate (5) is fixed with a second cylinder (11), and a bottom of each second cylinder (11) abuts against the bottom wall of an inner side of each first cylinder (3); a plurality of heating columns (12) are fixed in an inner circumference of each second cylinder (11), and a first air pump (13) is arranged between the heating columns (12); a plurality of air ducts (14) arranged in sequence at intervals are fixed in each second cylinder (11) from top to bottom, and a side wall of the air ducts (14) are fixedly connected and communicated with a plurality of air outlet pipes (15); air outlet directions of the air outlet pipes (15) are not parallel to an air outlet direction of each first air pump (13); each meat hanging space (16) is arranged between an inner side wall of each first cylinder (3) and the outer side wall of each second cylinder (11), and each meat hanging space (16) and the meat outlet channels (10) are arranged up and down correspondingly; and the air ducts (14) are communicated with each meat hanging space (16);
    a disinfection collection mechanism; wherein the disinfection collection mechanism comprises a second box body (17), and a heating wire (18) is embedded in an inner side wall of the second box body (17); the first box body (1) and the second box body (17) are arranged up and down correspondingly, a plurality of corrugated pipes (19) are fixedly connected and communicated between the first box body (1) and the second box body (17), and the meat outlet channels (10) and the corrugated pipes (19) are arranged up and down correspondingly; the bottom of the inner side of the second box body (17) is slidably connected with an aggregate truck, and the plurality of corrugated pipes (19) and the top of the aggregate truck are arranged up and down correspondingly; and
    a vibration mechanism; wherein the vibration mechanism comprises a first annular step (20) circumferentially fixed on the outside of the first box body (1) and a second annular step (21) circumferentially fixed on the outside of the second box body (17); a bottom of the second annular step (21) is circumferentially fixed with a plurality of first telescopic cylinders (22), an output end of each first telescopic cylinder (22) passes through the second annular step (21) and is fixedly connected with a push plate (23), and a plurality of vibration springs (24) are fixedly connected between a top end of the push plate (23) and a bottom end of the first annular step (20).

2. The air-drying device for processing of the cured meat products according to claim 1, wherein an outer side of each second cylinder (11) is covered with an air bag (25), and an outer side of the air bag (25) is covered with a rubber sleeve (26); connecting pipes (27) are inserted between each second cylinder (11), each air bag (25) and each rubber sleeve (26); one end of each connecting pipe (27) is communicated with each air duct (14), and the other end of each connecting pipe (27) is communicated with each meat hanging space (16); a top of each air bag (25) is fixedly connected and communicated with each hose (28), a top of each hose (28) penetrates through each cover plate (5) and is communicated with a gas collecting pipe (29); the hoses (28) of the plurality of air-drying components are all communicated with the gas collecting pipe (29), and flexible connectors (30) are fixedly connected between the gas collecting pipe (29) and the hoses (28), and the gas collecting pipe (29) is communicated with a second air pump (31), and the second air pump (31) is fixedly connected to the top wall inside the first box body (1).

3. The air-drying device for processing of the cured meat products according to claim 1, wherein the bottom of each cover plate (5) is circumferentially fixed with a plurality of hanging ropes (32), and bottom ends of the hanging ropes (32) are fixed with hooks (33), and the hooks (33) are located in each meat hanging space (16), and top ends of the hooks (33) are provided with blades (34); a bottom of each bearing plate (6) is fixed with a supporting plate (36) through a plurality of supporting columns (35), and there are gaps between the supporting columns (35); a bottom end of each supporting plate (36) is fixed with each second telescopic cylinder (37), and an output end of each second telescopic cylinder (37) penetrates through each supporting plate (36)

and is fixed with each blocking block (38), and each blocking block (38) is slidably connected in each meat outlet channel (10); a top end of each blocking block (38) is fixed with a clamping component, and each hook (33) and each clamping component are arranged up and down correspondingly.

4. The air-drying device for processing of the cured meat products according to claim 3, wherein each clamping component comprises a chute (39) fixed at a top of each blocking block (38); a two-way screw (40) is arranged in the chute (39); one end of the two-way screw (40) is fixedly connected with an output shaft of a second motor (41), and another end of the two-way screw (40) is pivotally connected with a second shaft sleeve (42); the second motor (41) and the second shaft sleeve (42) are fixedly connected to both ends inside the chute (39) respectively; two screw nuts (43) are slidably connected to the two-way screw (40); movement directions of the two screw nuts (43) are opposite, and top ends of the two lead screw nuts (43) are respectively fixed with a clamping block (44); and the hooks (33) and the clamping blocks (44) are arranged up and down correspondingly.

5. The air-drying device for processing of the cured meat products according to claim 4, wherein a plurality of guide plates (45) are circumferentially hinged at a joint between each blocking block (38) and the output end of each second telescopic cylinder (37), and a plurality of stoppers (46) are circumferentially fixed at a bottom end of each blocking block (38), and one end of each stopper (46) close to the output end of each second telescopic cylinder (37) abuts against each guide plate (45).

6. The air-drying device for processing of the cured meat products according to claim 3, wherein a plurality of first motors (47) are fixedly connected to the bottom wall of the inner side of the first box body (1), and the first motors (47) correspond to the air-drying components one by one, and the output ends of the first motors (47) are fixedly connected with support rods (48), and the support rods (48) are fixedly connected to the bottom ends of the bearing plates (6); the outer cover of each first motor (47) is provided with a guide sleeve (49), and each guide sleeve (49) is fixedly connected to the bottom end of each bearing plate (6); the outer side wall of each guide sleeve (49) is an arc-shaped surface; each guide sleeve (49) is located between the plurality of supporting plates (36), and a lowest point of each guide sleeve (49) is located at the bottom of each supporting plate (36); a partition (50) is fixed in the first box body (1), a plurality of first sleeves (51) are embedded in the partition (50), and the first cylinders (3) are rotatably connected in the first sleeves (51).

7. The air-drying device for processing of the cured meat products according to claim 6, wherein the light shielding plates (52) are embedded inside walls of the first box body (1), and ends of the partition (50) are fixedly connected with the light shielding plates (52).

8. The air-drying device for processing of the cured meat products according to claim 1, wherein the side wall of the second box body (17) is provided with a discharge port (53), and the discharge port (53) is arranged corresponding to the aggregate truck, and the discharge port (53) is detachably connected with a door panel (54).

9. The air-drying device for processing of the cured meat products according to claim 1, wherein the aggregate truck comprises a bottom plate (55), a top end of the bottom plate (55) is circumferentially fixed with a baffle plate (56), a bottom end of the bottom plate (55) is pivotally connected with a plurality of rollers (57), and the top end of the bottom plate (55) faces the corrugated pipes (19).

10. The air-drying device for processing of the cured meat products according to claim 1, wherein a bottom of the first box body (1) and a top of the second box body (17) are both penetrated with one material conveying channel (58) respectively; one end of each corrugated pipe (19) is fixedly connected in the material conveying channel (58) of the first box body (1), and an other end of each corrugated pipe (19) is fixedly connected in the material conveying channel (58) of the second box body (17).

\* \* \* \* \*